Figure 8:
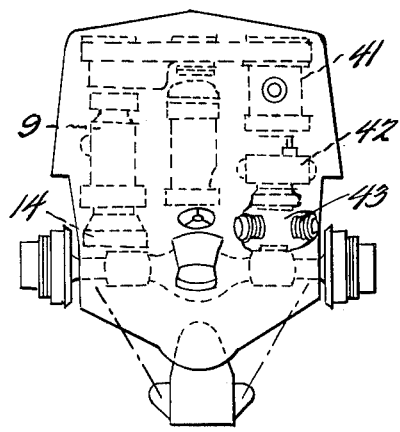

July 26, 1966  S. T. HENRIKSSON ETAL  3,262,513
COMBINED POWER VEHICLE AND TRAILER STRUCTURE
Filed Sept. 16, 1963
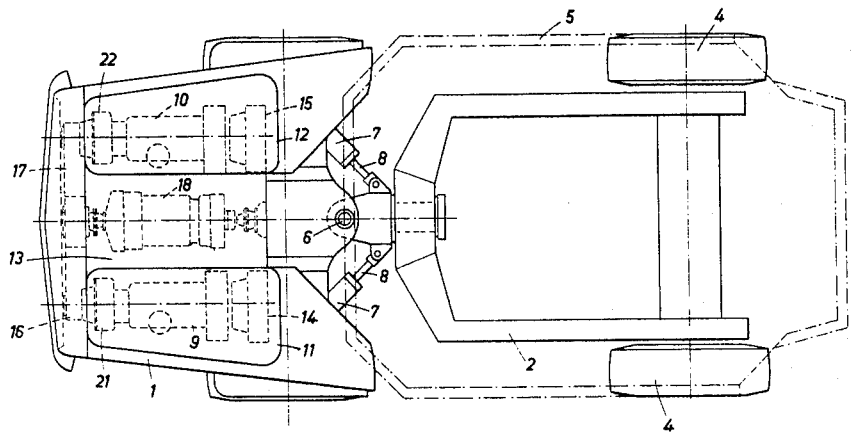
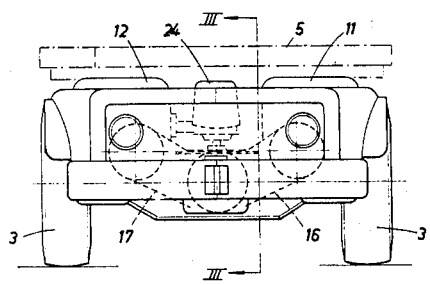
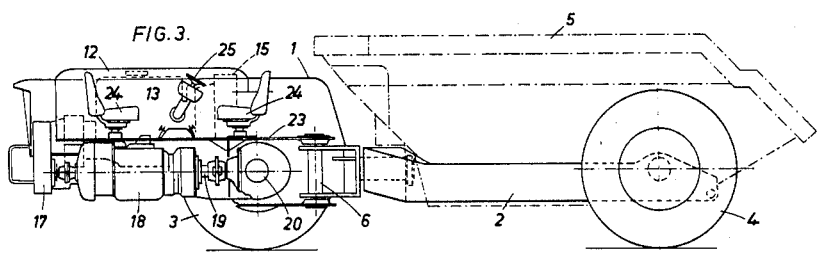
INVENTORS
Sune T. Henriksson,
Åke Malmgren,
Ragnar L. Muotka,
Lars Harald Widegren
by Sommers Young, Attorneys July 26, 1966  S. T. HENRIKSSON ETAL  3,262,513
COMBINED POWER VEHICLE AND TRAILER STRUCTURE
Filed Sept. 16, 1963  3 Sheets-Sheet 2
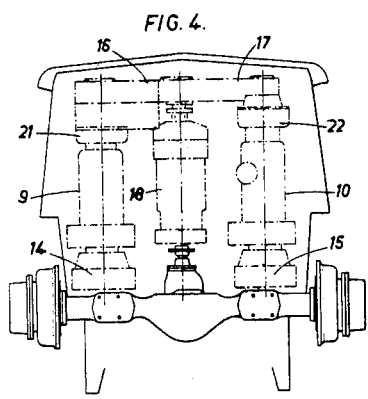
FIG. 4.
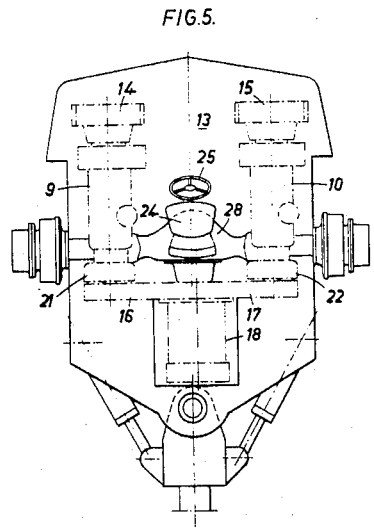
FIG. 5.
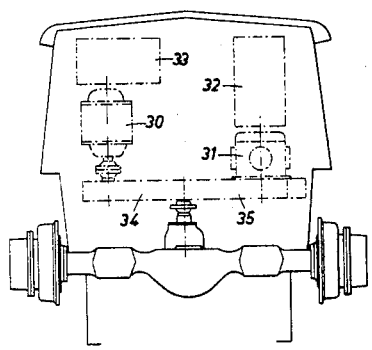
FIG. 7.
FIG. 6.
INVENTORS
Sune T. Henriksson,
Åke Malmgren,
Ragnar L. Muotka,
Lars Harald Widegren,
by Sommers & Young, Attorneys United States Patent Office 3,262,513
Patented July 26, 1966

3,262,513
COMBINED POWER VEHICLE AND TRAILER STRUCTURE
Sune Torsten Henriksson, Lingenstigen 2; Åke Malmgren, Tvargatan 5; Ragnar Ludvig Muotka, Kyrkogatan 46; and Lars Harald Widegren, Lararegatan 14, all of Kiruna, Sweden
Filed Sept. 16, 1963, Ser. No. 309,148
Claims priority, application Sweden, Oct. 2, 1962, 10,562/62
12 Claims. (Cl. 180—54)

The present invention relates to combined vehicle structures which comprise a power vehicle having one or more pairs of wheels and a trailer pivotally connected to said power vehicle so as to be capable of swinging relatively thereto about a vertical pivotal axis. The trailer may be of any desired type and may or may not be equipped with loading or dredging means or similar implements.

The object of the invention is to provide a power vehicle especially adapted for such combined vehicle structures, which may develop a maximum traction power at small dimensions, particularly as far as its length and height are concerned.

A special object of the invention is to provide combined power vehicle and trailer structures for use in connection with mining, digging or similar work.

A feature of the invention involves that the power vehicle is equipped with at least two motor units which may be independently coupled operatively to the driving axle or axles of the power vehicle in order to allow the generation of power to be suited to the special requirements appearing in mines.

Another feature involves that the motor units are so positioned within the same range of length of the power vehicle frame as to provide ample space for mounting a driver's seat or seats as well as control and steering elements within the range of length occupied by the motor units.

According to a further feature the motor units are coupled to the axle or axles of the power vehicle via transmission gears common to both units which involves a gear box.

As a still further feature the transmission including said gear box may be positioned either between or by the side of the motor units or at the side of the driving axle or axles opposite to that where the motor units are situated.

The motor units of the power vehicle may be of any appropriate kind, depending on the purpose for which the combined vehicle is especially provided.

The above stated and other features of the invention will be more clearly pointed out in the following detailed description, reference being had to the accompanying drawings in which preferred embodiments of the invention are illustrated.

In the drawings, FIG. 1 is a top plan view of a combined power vehicle and trailer according to the invention with any driver's seat or any control and steering mechanisms not shown. FIG. 2 is a front view of the combined vehicle structure shown in FIG. 1. FIG. 3 is a vertical longitudinal section along the line III—III of FIG. 2. FIG. 4 is a diagrammatic plan view of a modified form of the power vehicle shown in FIGS. 1–3. FIG. 5 is a diagrammatic plan view of a further modified power vehicle. FIG. 6 is an end view and partial cross section of the power vehicle shown in FIG. 5. FIG. 7 is a diagrammatic plan view of a power vehicle including different types of motor units.

Figure 9:
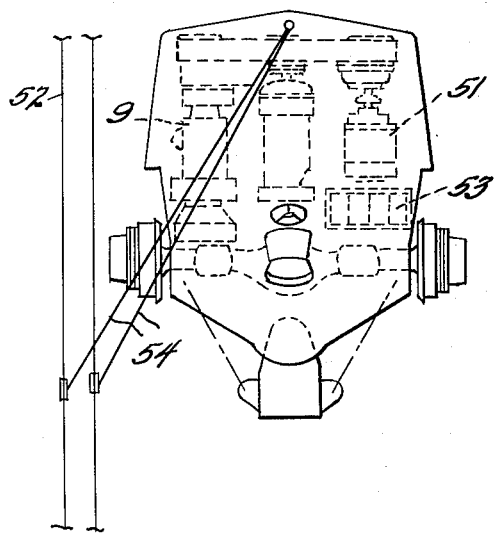

FIGURE 8 is a diagrammatic plan view of a modified form of power vehicle according to FIGS. 1–3 but employing a compressed air driven motor fed by an accumulator and an engine driven compressor. FIGURE 9 is a diagrammatic plan view of a power vehicle according to FIGS. 1–3 but employing an electric motor driven by a stationary electric net-work and an electric motor driven by an accumulator battery.

The combined power vehicle and trailer shown in FIGS. 1–3 comprises a power vehicle having a single pair of wheels and a trailer having likewise a single wheel pair. The frame of the power vehicle, the outlines of which looking in plan will appear from FIG. 1, is designated by 1 and the frame of the trailer, the outlines of which looking in plan will also appear from FIG. 1, is designated by 2. The pair of wheels of the power vehicle is designated by 3 and that of the trailer is designated by 4.

The body of the trailer may be constructed in any desired way according to the requirements. Thus, for instance, it may comprise a bucket with or without digging or loading means or other working implements. In the drawing the body is indicated as a tipping bucket 5.

The trailer is shown as connected to the power vehicle by means of a vertical pivot pin 6.

The elements necessary for steering purposes may be of conventional type. In the drawings they are shown as hydraulic or pneumatic cylinders 7, FIG. 1, mounted on the power vehicle frame and having their piston rods 8 connected to the trailer frame by means of vertical pivot pins.

The driving unit of the traction vehicle includes two engines 9 and 10, such as a pair of Diesel engines which may be considered to have the same power output. Said engines are placed near the opposite longitudinal sides of the power vehicle frame 1 and are enclosed within housings 11 and 12, respectively, between which there is a sufficient space 13 left for receiving one or more drivers' seats as well as means for controlling the engines and steering the combined vehicle. In the example shown the engines have their radiators 14, 15 facing rearwardly and their operative axle ends facing forwardly.

The shafts of the two engines are coupled via transmission gears 16 and 17, respectively, to the input shaft of a gear box 18 provided in the space between the engines 9, 10 on a level with the centers of the wheels 3, 3. The output shaft 19, FIG. 3, of said gear box is coupled via a conventional universal joint to the axles 20 of the wheels 3.

In order to permit independent coupling of the engines to the wheel shafts 20 overrun couplings 21 and 22, respectively, are inserted between the engine shafts and the respective transmission gears 16 and 17.

Provided above the gear box 18 in the space 13 between the engine housings 11 and 12 is a bottom 23, FIG. 3, upon which two drivers' seats 24 in front of and behind a steering wheel 25 and other means for controlling the engines and steering the combined vehicle are mounted.

By dividing the driving power between two engines which may be coupled individually to a common transmission leading to the wheel axles several advantages may be obtained. Thus, the length of the power vehicle may be reduced to a minimum while at the same time space will be available for arranging the drivers' seats and the controlling and steering means within said reduced length. As compared with a vehicle having but a single engine which develops the same effect as the total effect of the two engines of the vehicle illustrated several further advantages will be obtained, even if the said single engine with a view to shortening the length of the power vehicle were arranged as shown in the U.S. Patent 3,063,511.

Thus the radius of the smallest curve along which the combined vehicle may move, will be reduced because of the fact that two engines mounted side by side will require a smaller length than a single engine developing the same power as said two engines together. Furthermore, the single large engine requires as a rule considerably larger costs of procuring than two engines each developing half the power as the larger one. If, for instance, the two engines of the power vehicle according to the invention are of diesel type, each having a power output of 200 H.P. then an engine of the same type having a power output of 400 H.P. will, provided all engines are of conventional structure, be about 600 mm. longer and 200 mm. higher than an engine having a power output of 200 H.P. and, in addition, the large engine will cost about three times as much as a 200 H.P. engine.

Another point of interest in this connection is that such a large diesel engine will, as a rule, be of the type having a whirl chamber, whereas the smaller engine is constructed for direct injection and thus will be more suited for use in mines. From considerations of health no other known internal combustion engines may be used except those having direct injection of the fuel.

In the use of the above described combined power vehicle and trailer illustrated in FIGS. 1-3, either one or both engines may be used for propelling the vehicle, depending on the amount of load, the inclination of path and so on.

In FIG. 4 is shown an embodiment of the invention in which both engines which may, for instance, be direct injection diesel engines, develop different amounts of power in order to especially be suitable for running in mines. One engine may, for instance, be suited for horizontal running with a resulting low exhaust defiling effect, whereas the other engine may be chosen with a view to yield the highest power output and the greatest speed allowable when propelling the vehicle in inclined paths. As an example it may be mentioned that in order to propel a vehicle having a weight of 30 tons at a speed of 15.5 miles an hour along a horizontal path a power of 95 H.P. is required. With reference to FIG. 4 this power may be assumed to be delivered by the smaller engine 9. In order to propel a vehicle weight which amounts to 30 tons at a speed of 15.5 miles an hour along an inclined path the gradient of which is equal to 1:8 there would be required a power of 490 H.P., which may be assumed to be delivered by the two engines together. Thus, in a driving system satisfying these conditions and in which the engine 9, that is the "horizontal path engine," yields 95 H.P., the engine 10, that is the "inclined path engine," should yield 395 H.P. so that both engines run together would give 95+395 H.P., that is 490 H.P. Owing to mounting spaces and direct injection equipments also in respect of the "inclined path engine," said engine should preferably be a 200 H.P. engine. In order to allow this it must be assumed that the required speed would be reduced to about 10 miles an hour while running along a path of a maximum gradient amounting to about 1:8. At this inclination of 1:8, with a total weight of the vehicle amounting to 30 tons and a speed of 10 miles an hour, a power of 295 H.P. is required. Thus, the two engines 9 and 10 of the embodiment shown in FIG. 4 should preferably yield 95 and 200 H.P. respectively.

The embodiment shown in FIG. 4 corresponds with exception of the dimensions of the motor engine units substantially with the embodiment shown in FIGS. 1-3 as far as the power vehicle is concerned. Identical reference numerals are therefore used in FIG. 4 as in FIGS. 1-3 in respect of corresponding details.

In FIGS. 5-6 a construction is shown in which the radiators 14, 15 of the two engine units 9 and 10 are positioned at the front ends of the engines and the power shafts project at the rear ends of the engines where they are coupled via overrunning clutches 21 and 22 to the transmission gears 16, 17 which are in this case situated behind the wheel axles. Via said transmission gears the engine shafts are connected to the input shaft of a gear box 18 situated behind the transmission gears. The output shaft of the gear box 18 is forwardly directed and connected to the cardan joint of the wheel axles.

In FIG. 6 the input shaft of the gear box 18 is indicated at 26 and the output shaft at 27. In FIG. 5 the housing of the cardan joint is shown at 28. Furthermore, FIG. 5 shows a driver's seat at 24 and a steering wheel at 25 in the space 13 between the two engine units. The driver's seat is also indicated in FIG. 6.

In FIGS. 5 and 6 the two engine units are shown as equally large, but the relative positioning of the engine units shown in these figures may, of course, be adopted also in respect to engines of different magnitudes, as for instance in respect to engines of the types described in connection with the description of FIG. 4.

In all embodiments of the power system above described the two engine units comprise internal combustion engines and more particularly diesel engines. Without departing from the principle of the invention any one of the units may be replaced by an engine of a different kind, such as for instance a motor 41 driven by compressed air which is illustrated in FIG. 8. Such a combination is especially suitable for a transportation machine that has to run, in part, within a ventilated space where the exhaust gases of a diesel engine may be accepted and, in part, within ranges more difficult to ventilate, where only air driven engines may be allowed and, finally, it may also be used within ranges where a maximum power is required (inclined paths) and both units are required for propelling the transportation machine. Owing to the greater advantages of a wheeled but otherwise freely movable transportation machine as compared with those of a railbound transportation machine as far as speed and flexibility are concerned, a power system including the combination of a diesel engine and a compressed-air motor will form an efficient complement to the solely diesel driven machine. In mines it very often happens that transportation machines have to be loaded with ore within difficulty ventilated ranges, from where the air motor has to drive the machine to a ventilated transportation path. An additional advantage is that an air motor 41 that is supplied with compressed air from a container 42 (accumulator) mounted on the power vehicle aids ventilation while in operation. Upon reaching a ventilated place the disel engine 9 is started. The diesel engine may, at the same time that it alone or in conjunction with the air motor propels the transportation machine, also be utilized for driving a compressor unit 43 for supplying compressed air to the accumulator 42 on the power vehicle. To this end the air motor 41 which in the way described in connection with the description of the diesel units is coupled to the transmission gear connected with the wheel axles via an overrunning clutch, is coupled in series with the compressor unit 43. The accumulator may, however, if desired be supplied with compressed air from the stationary air compression installation of the mine.

Instead of having an air driven motor as one power unit, one can use, for instance, an electric motor 51, as shown in FIG. 9. Such a combination may be used, for instance, within a range where there is a transportation path conventionally permanently present along, say, 75% of its length and an electric conduit 52 extending along this permanent path for delivering current to the electric motor 51, through trolley means 54 while the remainder of the path has no current conduits extending therealong and is adapted, for loading and unloading only where the internal combustion engine 9 is used for the propelling of the vehicle. The advantage of such a combination of an electric motor 51 and an internal combustion engine 9 is, amongst others, that very great powers may be based within the restricted space of the power vehicle. In the today's position of mining technique inclined paths are used having a gradient of at most 1:10, while by adopting the present invention inclined paths may be used having a gradient of 1:7, whereby large building amounts may be saved. Further advantages resulting from the invention are an increased transportation speed, a reduction of the costs of ventilation, when operating in mines and a general reduction of the working costs.

As regards the combination of a diesel engine and an electric motor the electric motor may, of course, be driven completely or partially by current delivered by an accumulator battery 53 mounted on the power vehicle.

It is to be noted also that combinations of power units may be used for the purpose of this invention which do not include any internal combustion engine. Such a combination is diagrammatically shown in FIG. 7. In this case one power unit comprises an electric motor 30 having means, not shown, for taking off current from a conduit extending along the transportion path, while the other power unit comprises a motor 31 driven by compressed air delivered from an accumulator 32. The electric motor 30 may be coupled to an air compressor 33. The motors 30 and 31 are connected via transmission gears 34 and 35, respectively, to a gear box, not shown, and a cardan joint to the wheel axis to be driven.

This combination is adapted for use within ranges where an internal combustion engine must not be used at all for reasons of health.

In all embodiments hereinbefore described the power vehicle is equipped with only a single pair of wheels. The power vehicle may, however, if desired be built for two pairs of wheels all of which are positively driven. To this end the embodiment shown in FIGS. 5 and 6 may be modified by providing it with a so-called "drop box" including two power outputs, viz. one forwardly directed and another rearwardly directed. The forwardly directed power output may be connected via a short propeller shaft with the front wheel axis, whereas the rearwardly directed power output may be connected via a propeller shaft extending through a swinging instrument with the rear driving axle. The steering may be principally equal to that of a power vehicle having but one pair of wheels.

We claim:

1. In a power vehicle adapted for propelling a trailer pivotally connected thereto, the combination of a frame, means at the rear end of said frame for coupling it to the trailer, a pair of wheels and associated drive axles mounted on the frame adjacent the rear end thereof, two power generating systems extending in the longitudinal direction of the frame within the same range of length thereof in front of the drive axles of the wheels, said systems comprising engines having their power shafts projecting at the fore end of the frame, the systems with the engines being situated along opposite side of the frame so as to leave a space between themselves sufficient for receiving a platform for a driver's seat and associated steering mechanism, a power transmission system common to both power generating systems provided in said space below said platform within the same range of length of the frame as the power generating system, gearings between the shafts of the power systems and said common transmission system, and means for delivering the power from said common transmission system to the wheel axles, all of the elements recited being positioned in front of the wheel axles.

2. In a power vehicle as claimed in claim 1, the further feature that each power generating system is independently connectable to and disconnectable from said common power transmission means.

3. In a power vehicle as claimed in claim 1, the further feature that both power generating systems comprise internal combustion engines of the same or substantially the same power output.

4. In a power vehicle as claimed in claim 1, the further feature that the two power generating systems comprise internal combustion engines having different power outputs for propelling the vehicle on horizontal and inclined paths, respectively.

5. In a power vehicle as claimed in claim 1, the further feature that only one power generating system comprises an internal combustion engine, the other power generating system comprising an electric motor to be driven by current taken off from a stationary conducting network.

6. In a power vehicle as claimed in claim 1, and in which only one of the two power generating systems comprises an internal combustion engine, the further feature that the other system comprises an electric motor supplied with current from an accumulator battery mounted on the vehicle.

7. In a power vehicle as claimed in claim 1, and in which only one power generating system comprises an internal combustion engine, the further feature that the other system comprises a motor driven by compressed air.

8. In a power vehicle as claimed in claim 1, and in which the power generating systems comprise an internal combustion engine and a motor driven by compressed air, the further feature that the vehicle is provided with a compressed air accumulator for feeding said motor.

9. In a power vehicle as claimed in claim 1, and in which the power generating system comprises an internal combustion engine and a motor driven by compressed air, delivered by an accumulator mounted on the vehicle, the provision on the vehicle of an air compressor for feeding said accumulator, the internal combustion engine being arranged in addition to its delivering power to the drive axles of the vehicle to drive said compressor.

10. In a power vehicle as claimed in claim 1, the feature that both power generating systems comprise non-combustion motors.

11. In a power vehicle as claimed in claim 1, and in which both power generating systems comprise non-combustion motors, the further feature that one system comprises a motor driven by compressed air, the other system comprising an electric motor.

12. In a power vehicle adapted for propelling a trailer pivotally connected thereto, the combination of a frame, means at the rear end of said frame for coupling it to the trailer, a pair of wheels and associated drive axles mounted on said frame, two power generating systems extending in the longitudinal direction of the frame within the same range of length thereof in front of the drive axles of the wheels, said systems comprising engines having power shafts projecting at the rear of said axles, said systems with said engines being situated along opposite sides of said frame so as to leave space between themselves sufficient to receive a platform for a driver's seat and associated steering mechanism, a power transmission system common to both power generating systems provided in said space below said platform within the same range of length of said frame as said power generating systems, gearing between the shafts of said power systems and said common transmission system, and means for delivering the power from said common transmission system to the wheel axles, said power delivering means being located in the rear of said wheel axles.

(References on following page)

References Cited by the Examiner

UNITED STATES PATENTS

| | | |
|---|---|---|
| 875,851 | 1/1908 | Russell. |
| 1,261,069 | 4/1918 | Thomas _____ 290—14 |
| 1,389,010 | 8/1921 | Putnam _____ 180—6.48 |
| 1,932,698 | 10/1933 | Jose _____ 180—66 |
| 2,004,749 | 6/1935 | Dillon _____ 180—70 X |
| 2,366,646 | 1/1945 | Orr. |
| 2,407,007 | 9/1946 | Henrichsen _____ 180—54 X |
| 2,454,070 | 11/1948 | Le Tourneau _____ 180—29 |
| 2,516,816 | 7/1950 | Wagner et al. |
| 3,063,511 | 11/1962 | Malmgren _____ 180—12 |

FOREIGN PATENTS

| | | |
|---|---|---|
| 393,311 | 5/1933 | Great Britain. |
| 539,097 | 8/1941 | Great Britain. |

BENJAMIN HERSH, *Primary Examiner.*

A. HARRY LEVY, *Examiner.*

M. L. SMITH, *Assistant Examiner.*